UNITED STATES PATENT OFFICE.

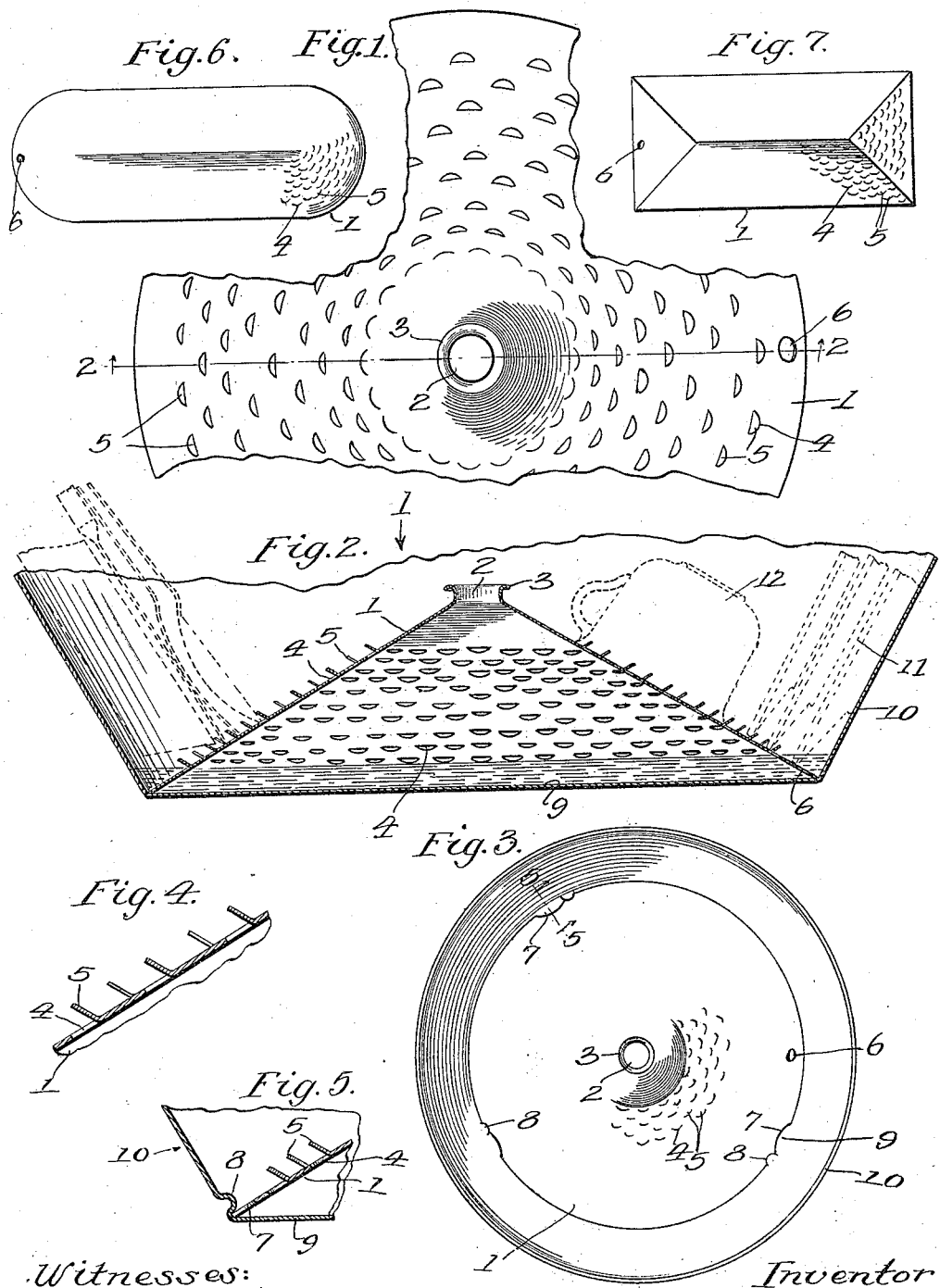

CHARLES A. HOLBERT, OF LOS ANGELES, CALIFORNIA.

DISH-DRAINER.

1,045,290.  Specification of Letters Patent.  Patented Nov. 26, 1912.

Application filed April 15, 1912. Serial No. 691,007.

*To all whom it may concern:*

Be it known that I, CHARLES A. HOLBERT, a citizen of the United States, residing at Los Angeles, county of Los Angeles, State of California, have invented a new and useful Dish-Drainer, of which the following is a specification.

My object is to produce a device for holding table dishes so that they may be rinsed and dried without handling.

A further object of my invention is to provide a rack which may be used in a dishpan and in a kitchen sink, or the like, for holding table dishes so that they may be rinsed and dried without handling. And a further object of my invention is to produce a device of the class described which is simple, efficient and inexpensive.

My invention consists of the novel features herein shown, described and claimed.

In the drawings—Figure 1 is a fragmentary top plan view of one form of rack as seen looking in the direction indicated by the arrow 1 in Fig. 2. Fig. 2 is a sectional elevation showing the rack in a dishpan, the view being taken on the line 2—2 of Fig. 1. Fig. 3 is a top plan view of the rack and dishpan shown in Fig. 2 upon a reduced scale. Fig. 4 is an enlarged fragmentary sectional detail on a plane similar to Fig. 2. Fig. 5 is a fragmentary sectional detail on the line 5—5 of Fig. 3. Fig. 6 is a plan of an oblong rack, whereas the rack shown in Fig. 1 is round. Fig. 7 is a plan of a rectangular rack.

Referring to the drawings in detail: The rack 1 shown in Figs. 1, 2 and 3 is substantially circular in plan and conical in elevation or section. It is preferably pressed or spun from a single piece of metal. An opening 2 is formed from its center and the metal is curved upwardly and outwardly to form the handle 3. Semi-circular slits 4 are made in the metal and the metal within the slits is turned upwardly to form the teeth 5, there being a large number of the teeth 5, preferably arranged in concentric circles extending from the handle 3 to near the lower edge of the rack. An opening 6 is formed near the edge of the rack so that the rack may be removed from the dishpan and hung on a hook or nail. The diameter of the rack preferably should be substantially equal to the diameter of the bottom of the dishpan in which it is to be used.

Notches 7 are formed in the edge of the rack 1 and retaining lugs 8 are formed just above the bottom 9 of the dishpan 10, so that when the rack is placed in the dishpan the lugs 8 will pass through the notches 7 and then if the rack is rotated the edge of the rack will pass under the lugs 8 and hold the rack securely in place.

In practical operation the rack is placed in the dishpan as shown in Fig. 2 and plates 11 may be stood on edge upon the rack and lean against the wall of the pan as shown in dotted lines and cups and other hollow ware 12 may be placed upon the rack and held from sliding in either direction by the teeth 5; then the hot water may be poured upon the dishes until the dishes are thoroughly rinsed and the water will gather in the bottom of the dishpan under the rack and the dishes may be left upon the rack to dry.

In Figs. 6 and 7 I have illustrated two of the many forms which may be made besides the circular form and these two forms are especially intended for use in kitchen sinks and the like. Each of the three forms shown are flat cones, that is, they are elevated in their centers and rest upon their rims.

When the racks are used in a kitchen sink a large number of dishes may be handled at one operation and the water will drain away whereas when the rack is used in a dishpan or the like the amount of water which may be used and still leave the dishes dry is limited.

The details of construction may be varied in many ways without departing from the spirit of my invention as set up in the following claims:

I claim—

1. In a dish drainer, a sheet metal rack having staggered rows of teeth pressed up from the body of the rack.

2. In a dish drainer, a metallic, hollow, foraminous body elevated in its center and resting upon its rim and having teeth extending upwardly and outwardly and adapted for holding dishes.

3. In a dish drainer, a metallic hollow body pressed up in its center, from a single sheet of metal and having staggered rows of teeth pressed upwardly from said body and adapted for holding dishes.

CHARLES A. HOLBERT.

Witnesses:
F. C. SCHAFFNER,
A. S. MAYNARD.

---

Copies of this patent may be obtained for five cents each, by addressing the "Commissioner of Patents, Washington, D. C."